United States Patent [19]

Becker et al.

[11] Patent Number: 4,484,266

[45] Date of Patent: Nov. 20, 1984

[54] EXTERNALLY SPECIFIED INDEX PERIPHERAL SIMULATION SYSTEM

[75] Inventors: Donald L. Becker, Fredericksburg; John C. Edwards, Dahlgren, both of Va.

[73] Assignee: The United States of America as represented by the Secretary of the Navy, Washington, D.C.

[21] Appl. No.: 329,848

[22] Filed: Dec. 11, 1981

[51] Int. Cl.³ .............................................. G06F 15/16
[52] U.S. Cl. .................................... 364/200; 364/900
[58] Field of Search ... 364/200 MS File, 900 MS File; 434/43

[56] References Cited

U.S. PATENT DOCUMENTS

| | | | |
|---|---|---|---|
| 3,721,961 | 3/1973 | Edstrom et al. | 340/172.5 |
| 3,932,843 | 1/1976 | Trelut et al. | 340/172.5 |
| 3,938,101 | 2/1976 | Lewis et al. | 340/172.5 |
| 4,070,705 | 1/1978 | Lockwood et al. | 364/200 |
| 4,152,766 | 5/1979 | Osofsky et al. | 434/43 |
| 4,179,823 | 12/1979 | Sullivan et al. | 434/43 |
| 4,188,664 | 2/1980 | DeShon | 364/200 |
| 4,195,351 | 3/1980 | Barner et al. | 364/900 |
| 4,204,251 | 5/1980 | Brudevold | 364/200 |
| 4,207,687 | 6/1980 | Haas et al. | 364/200 |
| 4,280,285 | 7/1981 | Haas | 434/43 |

Primary Examiner—Jerry Smith
Assistant Examiner—Gary V. Harkcom
Attorney, Agent, or Firm—Robert F. Beers; Kenneth E. Walden; John G. Wynn

[57] ABSTRACT

An Externally Specified Index (ESI) peripheral simulator portion of an ESI peripheral simulation system allows a plurality of parallel word input/output (I/O) channels of a tactical computer to communicate with each other as if real peripheral equipment were attached thereto. A simulation computer having a similar plurality of parallel word I/O channels is operatively connected to the ESI peripheral simulator such that it converts the interface signals of the simulation computer to be compatible with the interface signals of the tactical computer. Accordingly, the function of the ESI peripheral simulator is to simulate tactical peripherals. It accomplishes the foregoing function by using information transferred to it by the simulation computer.

7 Claims, 4 Drawing Figures

EXTERNALLY SPECIFIED INDEX PERIPHERAL SIMULATION SYSTEM

BACKGROUND OF THE INVENTION

1. Field of the Invention

The present invention relates to a peripheral simulation system for emulating real peripheral devices during the testing of tactical programs, but more specifically it relates to an Externally Specified Index (ESI) peripheral simulator for converting the signals of a simulation computer to be compatible with an operatively connected tactical computer.

2. Description of the Prior Art

In the prior art, simulation programs have been developed to test, for example, fire control programs in a realistic environment before being installed on ships. The simulation program supplies the fire control system with all of the data needed for the proper testing thereof. Thus, programmers can test tactical programs under actual conditions while still in the laboratory.

Notwithstanding the foregoing, a compatibility problem arises when, for example, a simulation computer which communicates through intercomputer input/output ports is used to test, for example, a Mark 92 Fire Control System, a tactical computer which interfaces via (ESI) peripheral input/output ports as specified in MIL-STD-1397 (SHIPS) Aug. 30, 1973. Consequently, there is a need in the prior art for an ESI peripheral simulator to be configured to interface between a simulation computer and a tactical computer in an improved manner.

There are two alternatives to the use of an ESI peripheral simulator according to the present invention. The first is the modification of the tactical computer program. This is not a practical alternative since the characteristics, functional and timing, of the input/output interface would be changed. Hence, a true operational test of the tactical program cannot be made. Thus, there is a need in the prior art to provide true operational testing of the tactical computer's program.

The second alternative is to use the actual tactical peripheral equipment connected to the tactical computer. This is not a practical approach either since every test and development site would require a full set of peripherals. Consequently, there is a need in the prior art to eliminate the necessity for a full set of peripherals at every development test site.

As further background material, in one embodiment of U.S. Pat. No. 3,932,843, filed Nov. 23, 1973, to Trelut et al, entitled, "Real-time Control Arrangement for a Simulation Device", is disclosed a simulation system configured for the development of a program to be used in a real-time operated system including a first computer and a second computer operating on a load-sharing basis. A simulation device including a simulation computer (third computer) and a simulation interface is coupled to the first and second computers to simulate their peripheral equipment by exchanging with the first and second computers data which would normally be exchanged between the first and second computers and their peripheral equipment. The simulation interface performs the aforementioned data exchanges between the first and second computers and the simulation computer. The simulation interface includes a time control arrangement for synchronizing the data exchanges and a memory arrangement for temporarily storing exchanged data.

In Trelut et al, the invention is directed towards a system for simulating real-time system peripheral equipment by exchanging with two time sharing (load sharing) computers and a third simulation computer, data which is normally exchanged between the time sharing computers and their actual peripheral equipment. This system is configured to transfer data in one direction across its simulation interface. There is no teaching, inter alia, of bi-directional transfer of information as taught in the present application.

Consequently, there is a need in the prior art to control the transfer of information, both actual data and commands, bidirectionally between a tactical computer and a simulation computer to provide true operational testing of the tactical computer's programs while simulating the actual tactical peripheral equipment that would normally be connected to the aforementioned tactical computer. This bi-direction transfer of information should include the interleaving of actual data and commands, i.e., command words should be interdispersed with actual data words.

The prior art, as indicated hereinabove, include advances in computer simulation devices and systems including devices and systems for simulating the peripheral equipment of a real-time system. However, insofar as can be determined, no prior art peripheral simulating system incorporates all of the features and advantages of the present invention.

OBJECTS OF THE INVENTION

Accordingly, a principal object of the present invention is to control the bi-directional transfer of information, both actual data and commands, between a tactical computer and a simulation computer in an improved manner.

Another object of the present invention is to provide true operational testing (real-time) of the tactical computer's programs.

Yet another object of the present invention is to simulate the tactical peripheral equipment connected to the tactical computer thereby eliminating the need for a full set of peripherals at every test and development site.

SUMMARY OF THE INVENTION

In accordance with the above stated objects, other objects, features and advantages, the present invention has as a primary purpose to control the transfer of information between a tactical computer and a simulation computer while eliminating the need for a full set of tactical peripherals at every test and development site. The foregoing is accomplished while providing true operational testing of the tactical computer's programs.

The essence of the present invention lies in five basic functional operations that are performed by an ESI peripheral simulator portion thereof. They are: (a) accepting an initialization external function code (command word) from a simulation computer portion thereof; (b) controlling the transfer of an external function code from the simulation computer to a tactical computer portion thereof; (c) controlling the transfer of data from the simulation computer to the tactical computer; (d) controlling the transfer of an external function code from the tactical computer to the simulation computer; and (e) controlling the transfer of data from the tactical computer to the simulation computer.

The purpose of the present invention is carried out by configuring the Externally Specified Index (ESI) peripheral simulation system, according to the present invention, to include the simulation computer, the tactical computer, and the ESI peripheral simulator operatively connected therebetween for interface control of the transfer of information. As previously mentioned, the ESI peripheral simulation system is configured to control and transfer information, i.e., actual data and external function (EXF) codes (command words), in a bi-directional manner, i.e., from the simulation computer to the tactical computer (S/T) or from the tactical computer to the simulation computer (T/S). The foregoing shorthand designations are used, along with others, to help in defining the operation of certain key elements of the present invention. To continue, the ESI peripheral simulator includes a transfer/decision/control device, a transfer count register, an ESI holding register, a S/T data holding register, a S/T EXF holding register, a T/S data holding register, a T/S EXF holding register, and a T/S EXF transfer register. The ESI peripheral simulator cooperates to convert the interface signals of the simulation computer to be compatible with the interface signals of the tactical computer.

BRIEF DESCRIPTION OF THE DRAWINGS

The previously stated objects, other objects, features and advantages of the present invention will be apparent from the following more particular description of a preferred embodiment as illustrated in the accompanying drawings, in which.

DESCRIPTION OF THE PREFERRED EMBODIMENT

Figure 1:
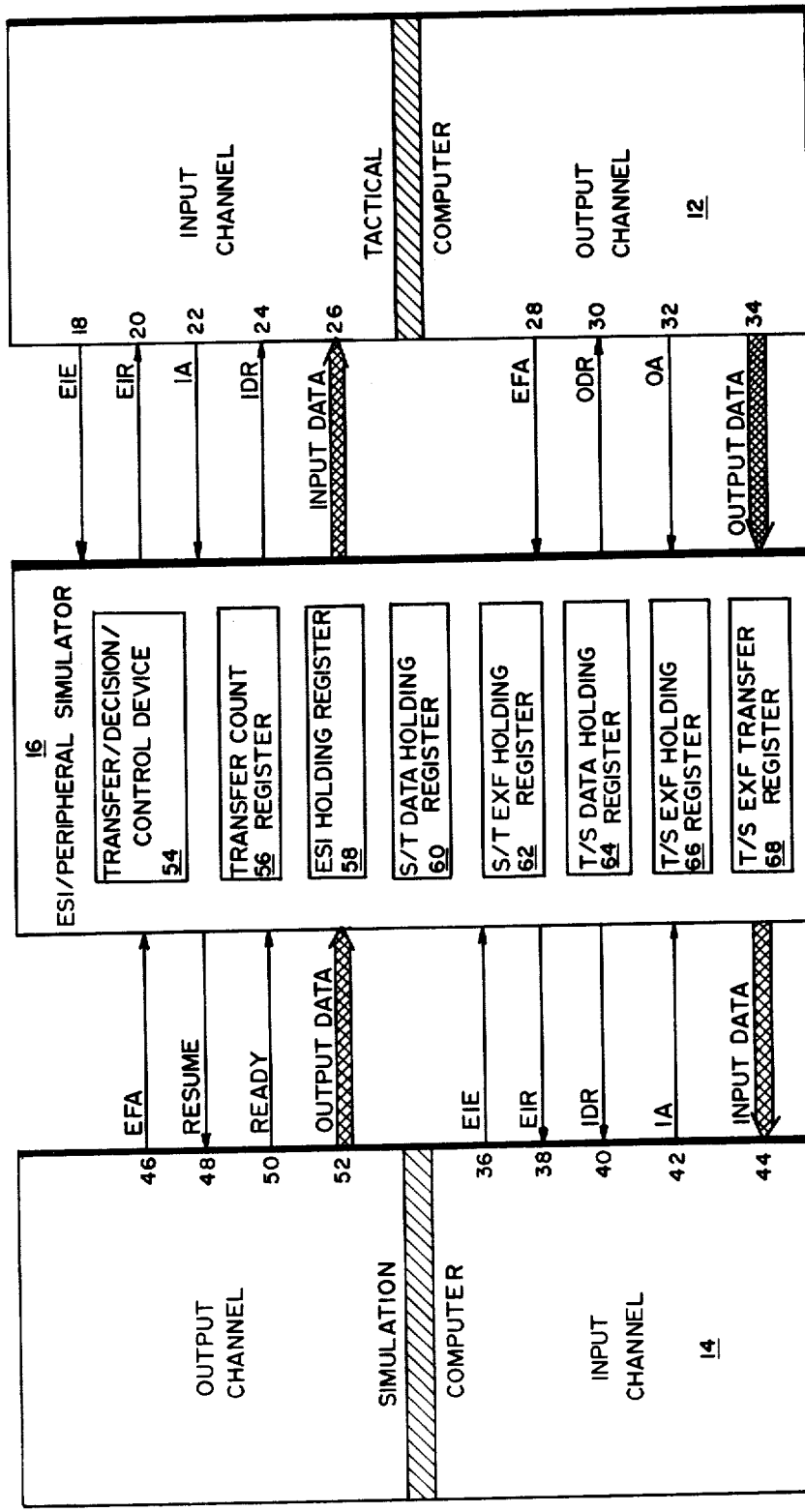
FIG. 1 is a block diagram representation of the ESI peripheral simulation system, according to the present invention, including the ESI peripheral simulator for checking actual programs to be run in the tactical computer and for interface control of information transfer between the simulation computer and the aforementioned tactical computer.

FIG. 1 shows an embodiment of an ESI peripheral simulation system in which the present invention is employed to convert interface signals of a simulation computer to be compatible with interface signals of a tactical computer while simulating peripherals of the tactical computer. The present invention is not limited to the simulation of tactical peripheral equipment but could also be used to simulate tactical to tactical computer transfers of information if operated in an ESI mode as outlined in the previously mentioned MIL-STD-1397(SHIPS) Aug. 30, 1973 which is incorporated herein by reference.

An ESI peripheral simulation system 10, according to the present invention, comprises a tactical computer 12 operatively connected to communicate bi-directionally with a simulation computer 14 via an ESI peripheral simulator 16. The ESI peripheral simulation system 10 comprises three identical simulation/tactical computer communication interfaces (only one shown in FIG. 1). Accordingly, the description hereintofollow describes any of the three actual communication interfaces.

Tactical computer 12 interfaces with ESI peripheral simulator 16, and, accordingly, simulation computer 14, via an external interrupt enable (EIE) line 18, an external interrupt request (EIR) line 20, an input acknowledge (IA) line 22, an input data request (IDR) line 24, and an input data bus 26 at an input channel of tactical computer 12. A corresponding output channel of tactical computer 12 interfaces with ESI peripheral simulator 16 via an external function acknowledge (EFA) line 28, an output data request (ODR) line 30, an output acknowledge (OA) line 32, and an output data bus 34.

Likewise, simulation computer 14 interfaces with ESI peripheral simulator 16, and, accordingly, tactical computer 12, via an external interrupt enable (EIE) line 36, an external interrupt request (EIR) line 38, an input data request (IDR) line 40, an input acknowledge (IA) line 42, and an input data bus 44 at an input channel of simulation computer 14. A corresponding output channel of simulation computer 14 interfaces with ESI peripheral simulator 16 via an external function acknowledge (EFA) line 46, a resume line 48, a ready line 50, and an output data bus 52.

ESI peripheral simulation system 10 of FIG. 1 is configured to control and transfer information in the form of actual data and external function (EXF) codes (command words) in a bi-directional manner from simulation computer 14, via ESI peripheral simulator 16, to tactical computer 12 (S/T) or from tactical computer 12, via ESI peripheral simulator 16, to simulation computer 12 (T/S). These shorthand designations are used to help in defining the function of certain of the elements shown. Continuing, peripheral simulator 16 includes a transfer/decision/control device 54 for interface control, a transfer count register 56 for control of the number of data words to be transferred from simulation computer 14 to tactical computer 12, an ESI holding register 58 for temporary storage of an index to be used by tactical computer 12 during data transfers therefrom to simulation computer 14, and a S/T data holding register 60 for temporary storage of data transferred from simulation computer 14 to tactical computer 12. ESI peripheral simulator 16 further includes a S/T EXF holding register 62 for temporary storage of external function words transferred from simulation computer 14 to tactical computer 12, a T/S data holding register 64 for temporary storage of data transferred from tactical computer 12 to simulation computer 14, a T/S EXF holding register 66 for first level temporary storage of external function words to be transferred from tactical computer 12 to simulation computer 14, and a T/S EXF transfer register 68 for second level temporary storage of external function words to be transferred from tactical computer 12 to simulation computer 14.

Figure 2A:
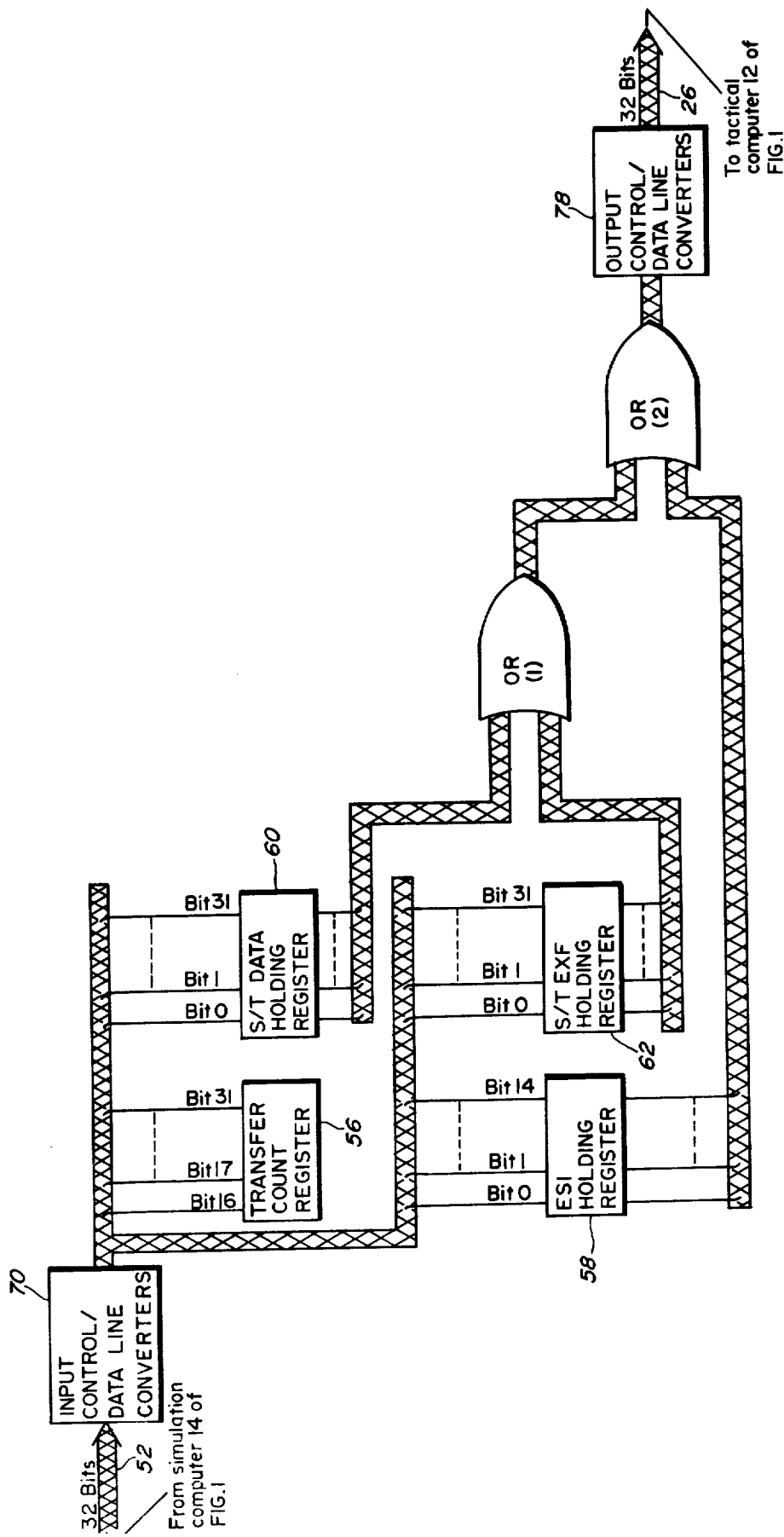
FIGS. 2a and 2b depict schematically and in block diagram form the information flow internal to the ESI peripheral simulator of FIG. 1 according to the present invention.
Figure 2B:
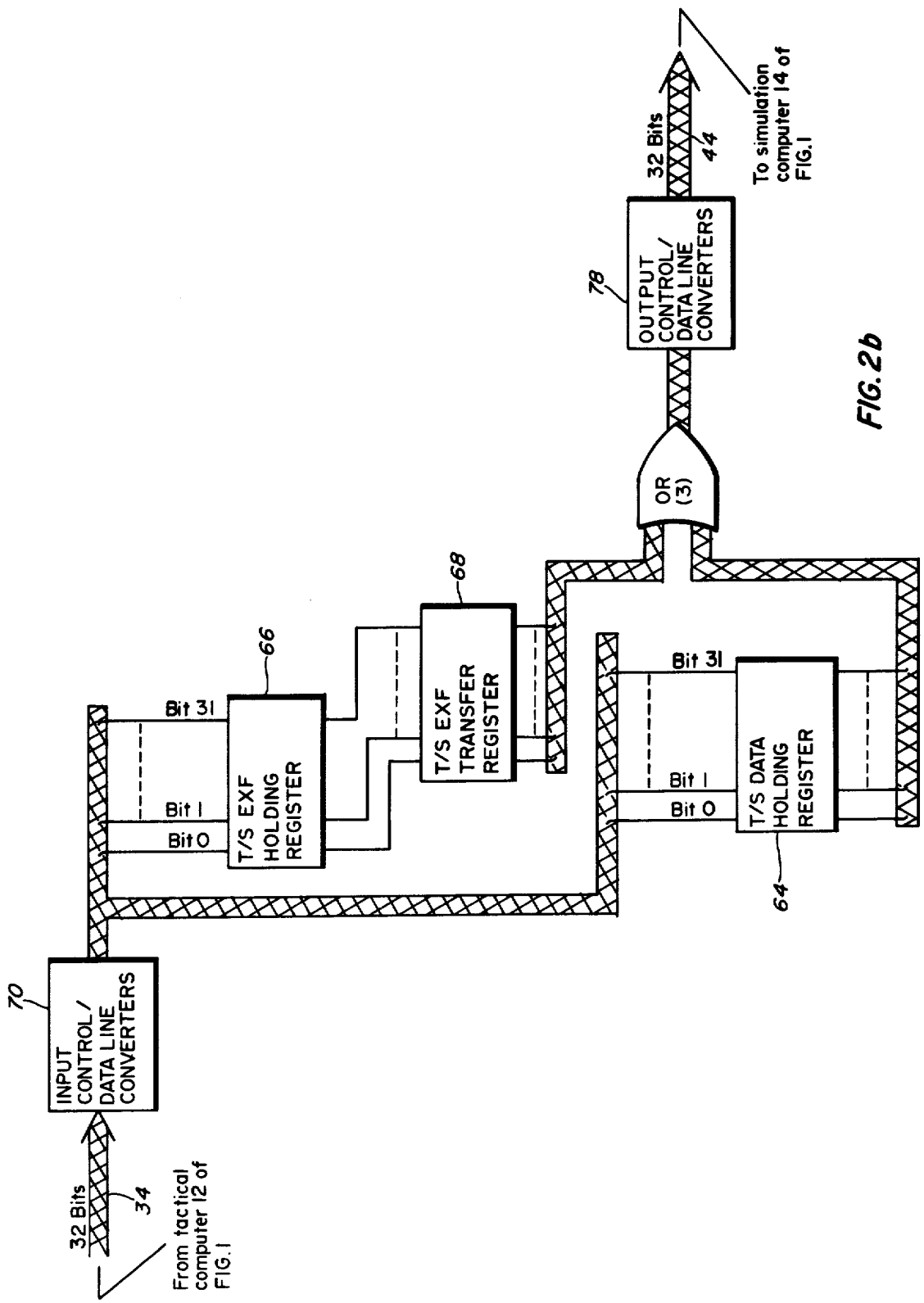

FIGS. 2a and 2b are representative of the internal bus structure of ESI peripheral simulator 16 illustrating the information flow of both data words and external function code command words.

FIG. 2a particularly illustrates the flow of information from simulation computer 14, via output data bus 52, through ESI peripheral simulator 16, and to tactical computer 12, via input data bus 26. As shown, ESI peripheral simulator 16 includes a plurality of input control/data line converters 70 for voltage level conversion of the control and data signals from simulation computer 14 to internal voltage levels used within ESI peripheral simulator 16, and a plurality of output control/data line converters 78 for voltage level conversion of the aforementioned internal voltage levels used within ESI peripheral simulator 16 to voltage levels compatible with the control and data signal levels required by tactical computer 12.

Still referring to FIG. 2a, two logical 'OR' circuits select the information to be placed on input data bus 26 to tactical computer 12. Thus, a logical 'OR' (1) circuit allows either the actual data held in S/T data holding register 60, or an external function code command word held in S/T EXF holding register 62 to be placed on input data bus 26 to tactical computer 12. likewise, a logical 'OR' (2) circuit allows either the result of the logical 'OR' (1) circuit operation, or the index held in ESI holding register 58 to be placed on data bus 26 to tactical computer 12.

FIG. 2b illustrates the flow of information from tactical computer 12, via output data bus 34, through ESI peripheral simulator 16, and to simulation computer 14, via input data bus 44. As shown, ESI peripheral simulator 16 includes a plurality of input control/data line converters 70 for voltage level conversion of the control and data signals of tactical computer 12 to internal voltage levels used within ESI peripheral simulator 16, and a plurality of output control/data line converters 78 for voltage level conversion of the aforementioned internal voltage levels used within ESI peripheral simulator 16 to voltage levels compatible with the control and data signal levels required by simulation computer 14.

Still referring to FIG. 2b, a single logical 'OR' circuit selects the information to be placed on input data bus 44 to simulation computer 14. Hence, a logical 'OR' (3) circuit allows either actual data held in T/S data holding register 64, or an external function code command word held in T/S EXF transfer register 68 to be placed on input data bus 44 to simulation computer 14.

Figure 3:
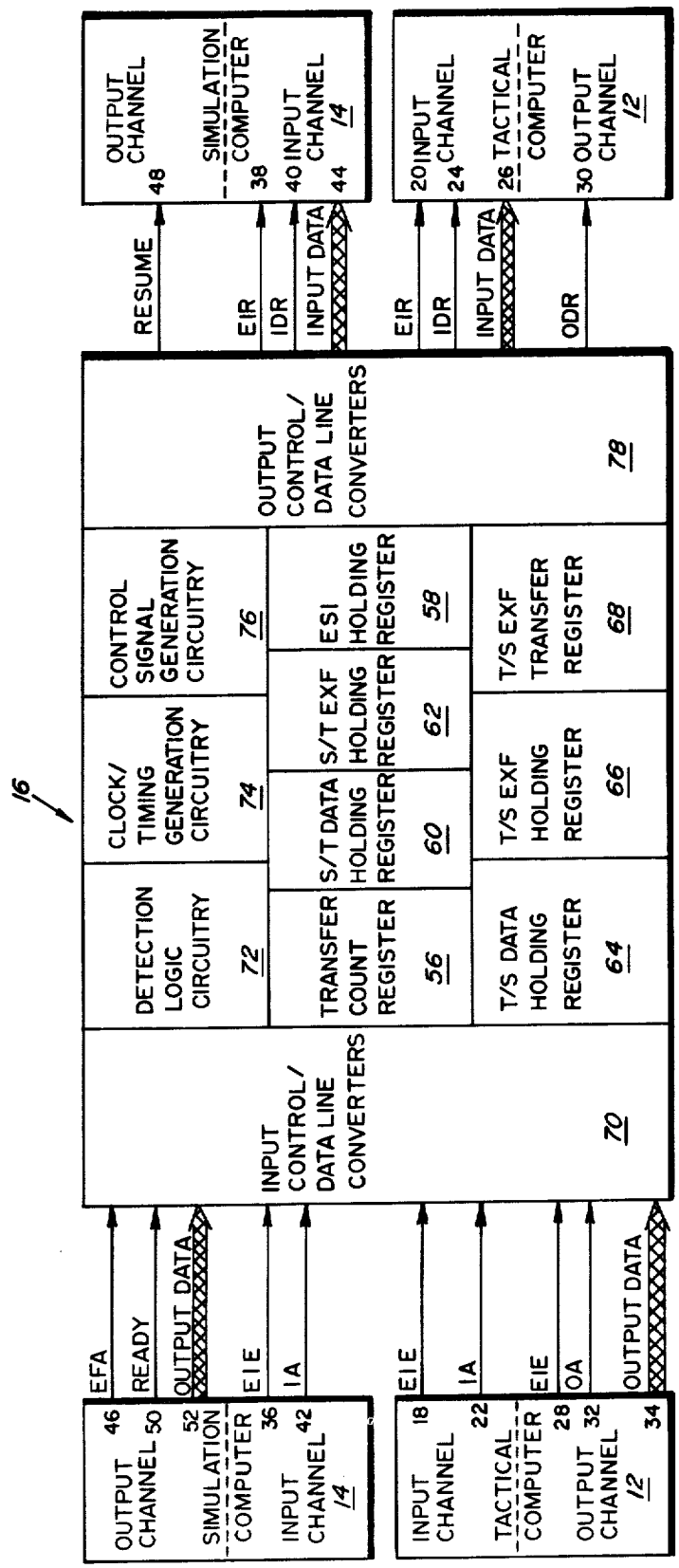
FIG. 3 is a more detailed block diagram representation of the detection, timing and signal generation functions relative to the operation of the ESI peripheral simulation system of FIG. 1 including the ESI peripheral simulator according to the present invention.

Referring now to FIG. 3, ESI peripheral simulator 16 further includes for detection, timing and signal generation: detection logic circuitry 72 for the detection of the state changes of tactical computer 12 and the control signals of simulation computer 14 on external function acknowledge line 46 and ready line 50, for example; clock/timing generation circuitry 74 for generating the required internal load, transfer, set and reset pulses, allow signals and control flags; and control signal generation circuitry 76 for generating the required control signals to tactical computer 12 and simulation computer 14 on resume line 48 and external interrupt request line 38, for example. The remaining blocks shown in FIG. 3 have been previously described in the discussion of FIG. 1 and FIGS. 2a and 2b.

STATEMENT OF THE OPERATION

Details of the operation, according to a preferred embodiment of the present invention, are explained in conjunction with FIGS. 1, 2a, 2b and 3 viewed concurrently. As stated hereinbefore, there are three identical simulation/tactical computer communication interfaces. Hence, the operational description which follows describes any of the communication interfaces. All signals pertaining to tactical computer 12 have a subscript "t" associated therewith, and all signals pertaining to simulation computer 14 have a subscript "s".

The main purpose of ESI peripheral simulator 16 is to control the transfer of information (both command words and actual data) between tactical computer 12 and simulation computer 14. Five basic operations are performed by ESI peripheral simulator 16, according to the present invention. The operations are: (a) accepting an initialization external function code (command word) from simulation computer 14; (b) controlling the transfer of the external function code from simulation computer 14 to tactical computer 12; (c) controlling the transfer of data from simulation computer 14 to tactical computer 12; (d) controlling the transfer of an external function code from tactical computer 12 to simulation computer 14; and (e) controlling the transfer of data from tactical computer 12 to simulation computer 14. Tactical computer 12 can terminate the foregoing transfer by setting a bit, for example bit 7, on output data bus 34 thereof. Normally, the setting of bit 7 is an indication of the last data word to be transferred. The foregoing five basic operations "a" through "e" are outlined below.

a. Accepting an Initialization EXFs Code from Simulation Computer 14

Simulation computer 14 initializes ESI peripheral simulator 16 by transmitting an external function word on output data bus 52. Simulation computer 14 sets external function acknowledge line 46 and places an external function word with bit 15 set on output data bus 52. ESI peripheral simulator 16 converts external function acknowledge line 46 to an EFAs control signal, and the data bits on output data bus 52, via input control/data line converters 70, to compatible internal simulator voltage levels. It also detects the occurrence of the EFAs control signal and bit 15, via detection logic circuitry 72; and generates register load pulses, via clock/timing generation circuitry 74, to load ESI holding register 58 with the data in bits 0–14 on output data bus 52, and to load transfer count register 56 with the data in bits 16–31 on output data bus 52, and resets, via clock/timing generation circuitry 74, its transfer inhibit flag. After the aforementioned registers are loaded, ESI peripheral simulator 16, via clock/timing generation circuitry 74, generates a control pulse to control signal generation circuitry 76 which, in turn, generates a control signal RESUMEs pulse. ESI peripheral simulator 16 converts the RESUMEs pulse, via output control/data line converters 78, to compatible simulation computer 14 voltage levels on resume line 48. Other functions are performed during initialization and are described hereinbelow in subsection "e".

b. Controlling the Transfer of the EXF Code from Simulation Computer 14 to Tactical Computer 12.

Simulation computer 14 sets external function acknowledge line 46 and places an external function word with bit 15 reset on output data bus 52. ESI peripheral simulator 16 converts external function acknowledge line 46 to an EFAs control signal, and the data bits on output data bus 52, via input control/data line converters 70, to compatible internal simulator voltage levels. It also detects the occurrence of the EFAs control signal and bit 15 reset, via detection logic circuitry 72; and generates a register load allow pulse, via clock/timing generation circuitry 74, to load S/T EXF holding register 62 with the data on output data bus 52. ESI peripheral simulator 16 converts external interrupt enable line 18 to an EIEt control signal, via input control/data line converters 70, to compatible internal simulator voltage levels. It also, detects the occurrence of the EIEt control signal and an ODRt reset pulse, via detection logic circuitry 72; and generates an allow signal, via clock/timing generation circuitry 74, to allow the information held in S/T EXF holding register 62 to be converted to compatible tactical computer 12 voltage levels, via output control/data line converters 78, on input data bus 26. It then, via clock/timing generation circuitry 74, generates a control pulse to control signal generation circuitry 76 which, in turn, generates a control signal EIRt. ESI peripheral simulator 16 converts the EIRt control signal, via output control/data line converters 78, to compatible tactical computer 12 voltage levels on external interrupt request line 20. If the abovementioned conditions are not met, the above sequence does not occur until the conditions are met. Tactical computer 12 responds to the setting of external interrupt request line 20 by setting its input acknowledge line 22. ESI peripheral simulator 16 converts input acknowledge line 22 to an IAt control signal, via input control/data line converters 70, to compatible internal simulator voltage levels. It also detects the occurrence of the IAt control signal, via detection logic circuitry 72; and generates, via clock/timing generation circuitry 74, a reset pulse to control signal generation circuitry 76 which resets the EIRt control signal on external interrupt request line 20. It then passes the IAt control signal to simulation computer 14 as a RESUMEs pulse by converting it, via output control/data line converters 78, to compatible simulation computer 14 voltage levels on resume line 48.

c. Controlling the Transfer of Data from Simulation Computer 14 to Tactical Computer 12.

Simulation computer 14 sets ready line 50 and places a data word on output data bus 52. ESI peripheral simulator 16 converts ready line 50 to a READYs control signal, and the data bits on output data bus 52, via input control/data line converters 70, to compatible internal simulator voltage levels. It also detects the occurrence of the READYs control signal, via detection logic circuitry 72; and generates a register load pulse, via clock/timing generation circuitry 74, to load S/T data holding register 60 with the data on output data bus 52. If the ODRt reset pulse is reset, ESI peripheral simulator 16 generates an allow signal, via clock/timing generation circuitry 74, to allow the data held in S/T data holding register 60 to be converted to compatible tactical computer 12 voltage levels, via output control/data line converters 78, on input data bus 26. It then, via clock/timing generation circuitry 74, generates a control pulse to control signal generation circuitry 76 which, in turn, generates an IDRt control signal. ESI peripheral simulator 16 converts the IDRt control signal, via output control/data line converters 78, to compatible tactical computer 12 voltage levels on input data request line 24. If the ODRt reset pulse is set, the abovementioned sequence does not occur until it is reset. Tactical computer 12 responds to the setting of input data request line 24 by setting its input acknowledge line 22. ESI peripheral simulator 16 converts input acknowledge line 22 to an IAt control signal, via input control/data line converters 70, to compatible internal simulator voltage levels. It also detects the occurrence of the IAt control signal, via detection logic circuitry 72; and generates, via clock/timing generation circuitry 74, a reset pulse to control signal generation circuitry 76 which, in turn, resets the IDRt control signal on input data request line 24. It then passes the IAt control signal to simulation computer 14 as a RESUMEs pulse by converting it, via output control/data line converters 78, to compatible simulation computer 14 voltage levels on resume line 48.

d. Controlling the Transfer of EXF Code from Tactical Computer 12 to Simulation Computer 14.

Tactical computer 12 sets external function acknowledge line 28 and places an external function word on output data bus 34. ESI peripheral simulator 16 converts external function acknowledge line 28 to an EFAt control signal, and the data bits on output data bus 34, via input control/data line converters 70, to compatible internal simulator voltage levels. It also detects the occurrence of the EFAt control signal, via detection logic circuitry 72; and generates a register load pulse, via clock/timing generation circuitry 74, to load T/S EXF holding register 66 with the information on output data bus 34 if the aforementioned register is free. ESI peripheral simulator 16 sets an internal EXF error indicator, via clock/timing generation circuitry 74, and stops the transfer if T/S EXF holding register 66 is active, i.e., not free. Upon loading, T/S EXF holding register 66 is made active. ESI peripheral simulator 16 converts external interrupt enable line 36 to an EIEs control signal, via input control/data line converters 70, to compatible internal simulator voltage levels. It also detects the occurrence of IDRs, EIRs and EIEs control signals, via detection logic circuitry 72; and generates a transfer clock pulse, via clock/timing generation circuitry 74, to transfer the information held in T/S EXF holding register 66 to T/S EXF transfer register 68. It then sets, via clock/timing generation circuitry 74, an indication that T/S EXF holding register 66 is free; generates, via clock/timing generation circuitry 74, a control pulse to control signal generation circuitry 76 which, in turn, generates a EIRs control signal; and generates an allow signal, via clock/timing generating circuitry 74, to allow the information held in T/S EXF transfer register 68 to be converted to compatible simulation computer 14 voltage levels, via output control/data line converters 78, on input data bus 44. ESI peripheral simulator 16 then converts the EIRs control signal, via output control/data line converters 78, to compatible simulation computer 14 voltage levels on external interrupt request line 38. However, if the above conditions are not met, the above sequence does not occur until the conditions are met. Simulation computer 14 responds to the setting of external interrupt request line 38 by setting its input acknowledge line 42. ESI peripheral simulator 16 converts input acknowledge line 42 to an IAs control signal, via input control/data line converters 70, to compatible internal simulator voltage levels. It also detects the occurrence of the IAs control signal, via detection logic circuitry 72; and generates, via clock/timing circuitry 74, a reset pulse to control signal generation circuitry 76 which, in turn, resets the EIRs control signal on external interrupt request line 38.

e. Controlling the Transfer of Data from Tactical Computer 12 to Simulation Computer 14.

ESI peripheral simulator 16 generates an allow signal, via clock/timing generation circuitry 74, to allow the data held in ESI holding register 58 to be converted to compatible tactical computer 12 voltage levels, via output control/data line converters 78, on input data bus 26. It also generates, via clock/timing generation circuitry 74, a control pulse to control signal generation circuitry 76 which, in turn, generates an ODRt control signal. The ODRt control signal is then converted, via output control/data line converters 78, to compatible tactical computer 12 voltage levels on output data request line 30 when ESI peripheral simulator 16 generates a RESUMEs pulse in response to the detection of the EFAs control signal, and bit 15 set (see subsection (a) above). Tactical computer 12 responds to the setting of output data request line 30 by setting its output acknowledge line 32 and placing an output data word on its output data bus 34. ESI peripheral simulator 16 converts output acknowledge line 32 to an OAt control signal, and the data bits on output data bus 34, via input control/data line converters 70, to compatible internal simulator voltage levels. It also detects the occurrence of the OAt control signal, via detection logic circuitry 72; and generates a register load pulse, via clock/timing generation circuitry 74, to load T/S data holding register 64 with the data on output data bus 34. It then generates, via clock/timing generation circuitry 74, a reset pulse to control signal generation circuitry 76 which, in turn, resets the ODRt control signal on output data request line 30. If bit 7 is set on output data bus 34, ESI peripheral simulator 16 detects this condition, via detection logic circuitry 72, and sets, via clock/timing generation circuitry 74, its transfer inhibit flag. If the EIRs control signal is reset, ESI peripheral simulator 16 decrements transfer count register 56; generates an allow signal, via clock/timing generation circuitry 74, to allow data held in T/S data register 64 to be converted to compatible simulation computer 14 voltage levels, via output control/data line converters 78, on input data bus 44; and generates, via clock/timing generation circuitry 74, a control pulse to control signal generation circuitry 76 which, in turn, generates an IDRs control signal. ESI peripheral simulator 16 converts the IDRs control signal, via output control/data line converters 78, to compatible simulation computer 14 voltage levels on input data request line 40. If the EIRs control signal is set, the above sequence is delayed until the EIRs control signal is reset. Simulation computer 14 responds to the setting of input data request line 40 by setting its input acknowledge line 42.

ESI peripheral simulator 16 converts input acknowledge line 42 to an IAs control signal, via input control/data line converters 70, to compatible internal simulator voltage levels. It also detects the occurrence of the IAs control signal, via detection logic circuitry 72; and generates, via clock/timing generation circuitry 74, a reset pulse to control signal generation circuitry 76 which, in turn, resets the IDRs control signal on input data request line 40. At this point in time, three different sequences can occur. They are as follows:

1. If the count in transfer count register 56 is zero, this portion of ESI peripheral simulator 16 becomes idle. It waits for another initialization sequence to occur (detection of the EFAs control signal, and bit 15 set, also see subsection (a) above)). The following two sequences will eventually terminate when the count in transfer count register 56 is zero.

2. If the transfer inhibit flag is not set and transfer count register 56 is not zero, ESI perpheral simulator 16 generates an allow signal, via clock/timing generation circuitry 74, to allow the data held in ESI holding register 58 to be converted to compatible tactical computer 12 voltage levels, via output control/data line converters 78, on input data bus 26. It also generates, via clock/timing generation circuitry 74, a control pulse to control signal generation circuitry 76 which, in turn, generates an ODRt control signal. It then converts the ODRt control signal, via output control/data line converters 78, to compatible tactical computer 12 voltage levels on output data request line 30. At this point in time, transfers continue as previously discussed.

3. If the transfer inhibit flag is set and transfer count register 56 is not zero, ESI peripheral simulator 16 does not generate the ODRt control signal. Instead, it checks the state of the EIRs control signal. If the EIRs control signal is reset, ESI peripheral simulator 16 decrements transfer count register 56; and generates an allow signal, via clock/timing generation circuitry 74, to allow data held in T/S data holding register 64 to be converted to compatible simulation computer 14 voltage levels, via output control/data line converters 78, on input data but 44. It also generates, via clock/timing generation circuitry 74, a control pulse to control signal generation circuitry 76 which, in turn, generates an IDRs control signal. It then converts the IDRs control signal, via output control/data line converters 78, to compatible simulation computer 14 voltage levels on input data request line 40. If the EIRs control signal is set, the sequence is delayed until it is reset. ESI peripheral simulator 16 waits for simulation computer 14 to respond to the setting of input data request line 40 by setting its input acknowledge line 42. At this point in time, the sequence continues as described in 1 or 3.

To those skilled in the art, modifications and variations of the present invention are possible in light of the above teachings. It is therefore to be understood that the present invention can be practiced otherwise than as specificaly described herein and still be within the spirit and scope of the appended claims.

What is claimed is:

1. An improved Externally Specified Index (ESI) peripheral simulation system including a tactical computer and a simulation computer, said ESI peripheral simulation system being configured to emulate real peripheral devices of said tactical computer during the testing of a tactical program, the tactical program being the real time operational program for the tactical computer, wherein the improvement comprises:

An Externally Specified Index (ESI) peripheral simulator operatively connected to input and output ports of said tactical computer and to input and output ports of said simulation computer for converting predetermined interface signals of said simulation computer to be compatible with predetermined interface signals of said tactical computer, for controlling and transferring information in the form of actual data and external function (EXF) codes (command words) in a bidirectional manner from said simulation computer to said tactical computer (S/T) or from said tactical computer to said simulation computer (T/S), and for interleaving the actual data and the command words while simulating the real peripheral devices and testing the tactical program of said tactical computer; wherein said ESI peripheral simulator comprises;

a transfer/decision/control device for interface control between said tactical computer and said simulation computer;

a transfer count register operatively connected to said transfer/decision/control device for counting the number of data words of actual data to be transferred from said simulation computer to said tactical computer, and for sending a control signal to said transfer/decision/control device when the count reaches zero, said transfer/decision/control device sensing the control signal and operating to terminate the actual data transfer in response thereto;

an ESI holding register operatively connected to said transfer/decision/control device for temporary storage of an index to be used by said tactical computer during the transfer of actual data to said simulation computer, the index being used to calculate the memory location within the tactical computer where the actual data is to be stored;

a S/T data holding register operatively connected to said transfer/decision/control device for the temporary storage of actual data transferred from said simulation computer to said tactical computer;

a S/T EXF holding register operatively connected to said transfer/decision/control device for the temporary storage of external function (EXF) codes (command words) transferred from said simulation computer to said tactical computer;

a T/S data holding register operatively connected to said transfer/decision/control device for the temporary storage of actual data transferred from said tactical computer to said simulation computer;

a T/S EXF holding register operatively connected to said transfer/decision/control device for first level temporary storage of external function (EXF) codes (command words) to be transferred from said tactical computer to said simulation computer; and a T/S EXF transfer register operatively connected to said T/S EXF holding register for second level temporary storage of external function (EXF) codes (command words) to be transferred from said tactical computer to said simulation computer, said T/S EXF holding register and said T/S EXF transfer register coacting such that a subsequent external function (EXF) code is held in said T/S EXF holding register until a previous external function (EXF) code has been transferred out of said T/S EXF transfer register, and such that the subsequent external function (EXF) code held in said T/S EXF holding register is immediately transferred into said T/S EXF Transfer register.

2. The ESI peripheral simulation system of claim 1 wherein said transfer/decision/control device portion of said ESI peripheral simulator comprises:

detection logic circuitry for detection of the state changes of control signals of said tactical computer and the control signals of said simulation computer;

clock/timing generation circuitry operatively connected to said detection logic circuitry for generating the required internal load, transfer, set and reset pulses, allow signals and control flags in response to the detection of the state changes of said tactical computer; and control signal generation circuitry operatively connected to said clock/timing generation circuitry for generation the required control signals transferred to said tactical computer and said simulation computer.

3. The ESI peripheral simulation system of claim 2 wherein said transfer/decision/control device of said ESI peripheral simulator further comprises:

input control/data line converters for voltage level conversion of control and data signals, corresponding to external function (EXF) codes (command words) and actual data, respectively, from said tactical computer and said simulation computer into internal voltage levels suitable for use within said ESI peripheral simulator.

4. The ESI peripheral simulation system of claim 3 wherein said transfer/decision/control device of said ESI peripheral simulator further comprises:

output control/data line converters for voltage level conversion of internal voltage levels within said ESI peripheral simulator into voltage levels compatible with control and data signals, corresponding to external function (EXF) codes (command words) and actual data, respectively, of said tactical computer and said simulation computer.

5. The ESI peripheral simulation system of claim 4 wherein said transfer/decision/control device of said ESI peripheral simulator further comprises:

a first logic circuit which operates to select the information to be placed on an input data bus to said tactical computer allowing either the actual data held in said S/T data holding register, or an external function (EXF) code (command word) held in said S/T EXF holding register to be placed on the input data bus to said tactical computer.

6. The ESI peripheral simulation system of claim 5 where said transfer/decision/control device of said ESI peripheral simulator further comprises:

a second logic circuit operatively connected to said first logic circuit and which operates to allow either the result of said first logic circuit operation, or the index held in said ESI holding register to be placed on the input data bus to said tactical computer.

7. The ESI peripherial simulation system of claim 6 wherein said transfer/decision/control device of said ESI peripheral simulator further comprises:

a third logic circuit which operates to select the information to be placed on an input data bus to said simulation computer allowing either the actual data held in said T/S data holding register, or an external function (EXF) code (command word) held in said T/S EXF transfer register to be placed on the input data bus to said simulation computer.

* * * * *